(12) United States Patent
Sun et al.

(10) Patent No.: US 12,277,263 B2
(45) Date of Patent: Apr. 15, 2025

(54) GAZE TRACKING FOR USER INTERFACE

(71) Applicant: Sony Interactive Entertainment Inc., Tokyo (JP)

(72) Inventors: Hee Gyung Sun, San Francisco, CA (US); Benjamin Andrew Rottler, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/856,731

(22) Filed: Jul. 1, 2022

(65) Prior Publication Data
US 2024/0004462 A1    Jan. 4, 2024

(51) Int. Cl.
| | |
|---|---|
| *G06F 3/01* | (2006.01) |
| *A63F 13/211* | (2014.01) |
| *A63F 13/428* | (2014.01) |
| *A63F 13/87* | (2014.01) |
| *G02B 27/00* | (2006.01) |
| *G02B 27/01* | (2006.01) |
| *G06F 3/04817* | (2022.01) |

(52) U.S. Cl.
CPC ............ *G06F 3/013* (2013.01); *A63F 13/211* (2014.09); *A63F 13/428* (2014.09); *A63F 13/87* (2014.09); *G02B 27/0093* (2013.01); *G02B 27/0101* (2013.01); *G02B 27/0172* (2013.01); *G06F 3/012* (2013.01); *G06F 3/04817* (2013.01); *G02B 2027/0138* (2013.01); *G02B 2027/014* (2013.01)

(58) Field of Classification Search
CPC ...... G06F 3/013; G06F 3/012; G06F 3/04817; A63F 13/211; A63F 13/428; A63F 13/87; G02B 27/0093; G02B 27/0101; G02B 27/0172; G02B 2027/0138; G02B 2027/014

See application file for complete search history.

(56) References Cited

U.S. PATENT DOCUMENTS

| | | | |
|---|---|---|---|
| 2013/0176208 A1* | 7/2013 | Tanaka | G06F 3/013 345/156 |
| 2016/0246384 A1 | 8/2016 | Mullins et al. | |
| 2018/0365270 A1* | 12/2018 | Azout | G06F 3/013 |
| 2018/0365928 A1 | 12/2018 | Froy et al. | |
| 2020/0005060 A1* | 1/2020 | Martin | G06V 20/597 |
| 2021/0173480 A1 | 6/2021 | Osterhout et al. | |

(Continued)

OTHER PUBLICATIONS

International Search Report and Written Opinion in PCT/US23/26251, dated Sep. 27, 2023, in 8 pages.

*Primary Examiner* — Afroza Chowdhury
(74) *Attorney, Agent, or Firm* — Kilpatrick Townsend & Stockton LLP

(57) ABSTRACT

Gaze tracking to track gaze of a user within a user view screen including: combining the gaze tracking with head movement tracking, wherein head movements of the head movement tracking provide rough estimate of a direction of the gaze of the user, while eye movements of the gaze tracking provide fine tuning of the direction of the gaze of the user within the user view screen; dividing the user view screen into a plurality of gaze zones when gaze zone estimation is turned on; and combining the gaze tracking with the gaze zone estimation to select a gaze zone from the plurality of gaze zones as the direction of the gaze of the user.

20 Claims, 5 Drawing Sheets

(56) References Cited

U.S. PATENT DOCUMENTS

2021/0182553 A1* 6/2021 Lv .......................... G06F 21/32
2022/0207773 A1* 6/2022 Nakamura ......... G02B 27/0093
2022/0229524 A1* 7/2022 McKenzie ............ G06F 3/0481
2022/0335648 A1* 10/2022 Wilhelm ................... G06T 7/74
2023/0071037 A1* 3/2023 Kim ..................... G06F 3/0482

* cited by examiner

GAZE TRACKING FOR USER INTERFACE

BACKGROUND

Field

The present disclosure relates to gaze tracking, and more specifically, to gaze tracking using eye movements as user inputs.

Background

Sometimes human eyes may move or twitch in different directions without any specific purpose or reason. Thus, detailed gaze or eye tracking is generally not used as inputs in games or other application programs since it may generate high fidelity noise.

SUMMARY

The present disclosure provides for gaze tracking to track gaze of a user within a user view screen.

In one implementation, a method for gaze tracking to track gaze of a user within a user view screen is disclosed. The method includes combining the gaze tracking with head movement tracking, wherein head movements of the head movement tracking provide rough estimate of a direction of the gaze of the user, while eye movements of the gaze tracking provide fine tuning of the direction of the gaze of the user within the user view screen. The method also includes dividing the user view screen into a plurality of gaze zones when gaze zone estimation is turned on. The method further includes combining the gaze tracking with the gaze zone estimation to select a gaze zone from the plurality of gaze zones as the direction of the gaze of the user.

In another implementation, a game device is disclosed. The game device includes a sensor and a processor. The sensor tracks gaze movements of a user. The processor is operable (a) to obtain information about the gaze movements from the sensor and (b) to execute an application program to display a gaze icon based on the gaze information and a notification icon within a screen image of the application program on a display. The notification icon is displayed at a predetermined position of the screen image.

In yet another implementation, a system for gaze tracking to track gaze of a user within a user view screen includes a gaze determiner, a processor, and a user interface. The processor combines the gaze tracking with head movement tracking, wherein head movements of the head movement tracking provide rough estimate of a direction of the gaze of the user, while eye movements of the gaze tracking provide fine tuning of the direction of the gaze of the user within the user view screen. The gaze determiner directs the processor to divide the user view screen into a plurality of gaze zones, and to combine the gaze tracking with the gaze zone estimation to select a gaze zone from the plurality of gaze zones as the direction of the gaze of the user, when the gaze determiner determines that gaze zone estimation is turned on.

In a further implementation, a non-transitory computer-readable storage medium storing a computer program to track gaze of a user within a user view screen is disclosed. The computer program includes executable instructions that cause a computer to combine the gaze tracking with head movement tracking, wherein head movements of the head movement tracking provide rough estimate of a direction of the gaze of the user, while eye movements of the gaze tracking provide fine tuning of the direction of the gaze of the user within the user view screen. The computer program also includes executable instructions that cause a computer to divide the user view screen into a plurality of gaze zones when gaze zone estimation is turned on. The computer program further includes executable instructions that cause a computer to combine the gaze tracking with the gaze zone estimation to select a gaze zone from the plurality of gaze zones as the direction of the gaze of the user.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, human eyes may move or twitch in different directions without any specific purpose or reason. Thus, detailed gaze or eye tracking is generally not used as inputs in games or interactive programs since it may generate high fidelity noise. However, in certain situations, gaze tracking can be used in coordination or conjunction with other methods and systems to enable it to be used with user interface.

Certain implementations of the present disclosure provide methods and systems for gaze tracking for user interface. In one implementation, the gaze tracking is combined with head movement tracking to provide fine tuning. In another implementation, gaze zone estimation is used to mitigate high fidelity noise introduced in detailed eye tracking. Thus, in the gaze zone estimation, one or more gaze zones may be expanded or highlighted in overlay picture(s) or picture-in-picture (PIP) mode. In a further implementation, the gaze tracking is used to provide notification to the user such that the user is minimally disrupted while, for example, playing a game or experiencing other application programs.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1:
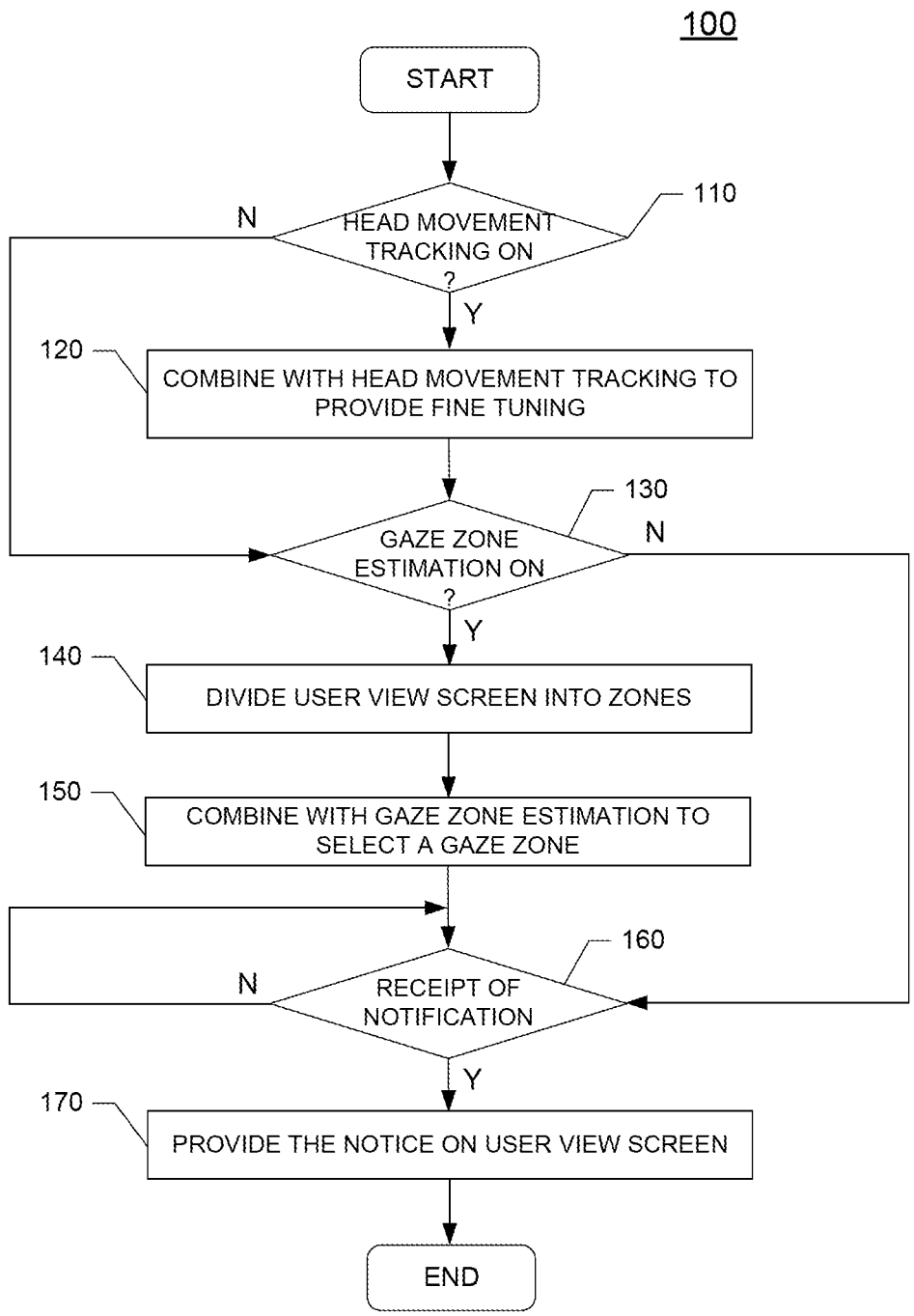
FIG. 1 is a flow diagram of a process for gaze tracking for user interface in accordance with one implementation of the present disclosure.

FIG. 1 is a flow diagram of a process 100 for gaze tracking for user interface in accordance with one implementation of the present disclosure. In one implementation, the process 100 enables gaze tracking for user interface by combining the gaze tracking with other methods and systems including head movement tracking and gaze zone estimation. In one implementation, the process 100 is programmed into a hardware processor to perform gaze tracking within a combined system.

In the illustrated implementation of FIG. 1, a determination is made, at step 110, whether head movement tracking is turned on. If it determined, at step 110, that the head movement tracking is turned on, the gaze tracking is combined with the head movement tracking, at step 120, to provide fine tuning. For example, the head movement tracking provides a rough estimate of the direction in which the user's head is facing, while the gaze tracking provides more detailed estimation of the direction of the user's head.

A determination is made, at step 130, whether gaze zone estimation is on. In one implementation, the gaze zone estimation divides the user view screen into zones (e.g., a preset size of a rectangular box), at step 140, and uses the gaze tracking to estimate the direction of the user's gaze to be within a selected zone. If it determined, at step 130, that the gaze zone estimation is on, the gaze tracking is combined with the gaze zone estimation, at step 150, to select a gaze zone. In one implementation, one or more gaze zones (including the selected zone) may be expanded or highlighted in overlay picture(s) or picture-in-picture (PIP) mode to show the detail view of the objects or persons within the user's gaze.

A determination is then made, at step 160, whether a notification is received. In one implementation, the notification includes communication to the user while the user is playing or experiencing a game or other interactive application program. If it determined, at step 160, that the notification is received, a notice is provided on the user view screen, at step 170, indicating that the communication is received. In one implementation, the communication includes message(s) from other users playing or experiencing the same game or interactive application program with the user. In another implementation, the communication includes message(s) from the game system. In a further implementation, the notice is provided on the user view screen as a bubble icon. In one implementation, when the user gazes in the direction of the icon, the details of the message are displayed on the user view screen. The above-described notification method enables providing notification to a user playing, for example, an interactive game, with minimal disruption.

In a particular implementation, a method for gaze tracking to track gaze of a user within a user view screen is disclosed. The method includes: combining the gaze tracking with head movement tracking, wherein head movements of the head movement tracking provide rough estimate of a direction of the gaze of the user, while eye movements of the gaze tracking provide fine tuning of the direction of the gaze of the user within the user view screen; dividing the user view screen into a plurality of gaze zones when gaze zone estimation is turned on; and combining the gaze tracking with the gaze zone estimation to select a gaze zone from the plurality of gaze zones as the direction of the gaze of the user.

In one implementation, the method further includes displaying an icon on the user view screen when the gaze tracking is turned on. In one implementation, each gaze zone of the plurality of gaze zones is a preset size of a rectangular box. In one implementation, one or more gaze zones around the selected zone is expanded or highlighted in an overlay picture or picture-in-picture mode to show a detail view of objects or persons within the gaze of the user. In one implementation, the method further includes displaying a notification icon on the user view screen when a notification is received. In one implementation, the notification includes a message from a game system. In one implementation, the notification includes a message from another user in the game system. In one implementation, the method further includes displaying the message on the user view screen when it is determined that the gaze of the user has moved to the notification icon.

Figure 2:
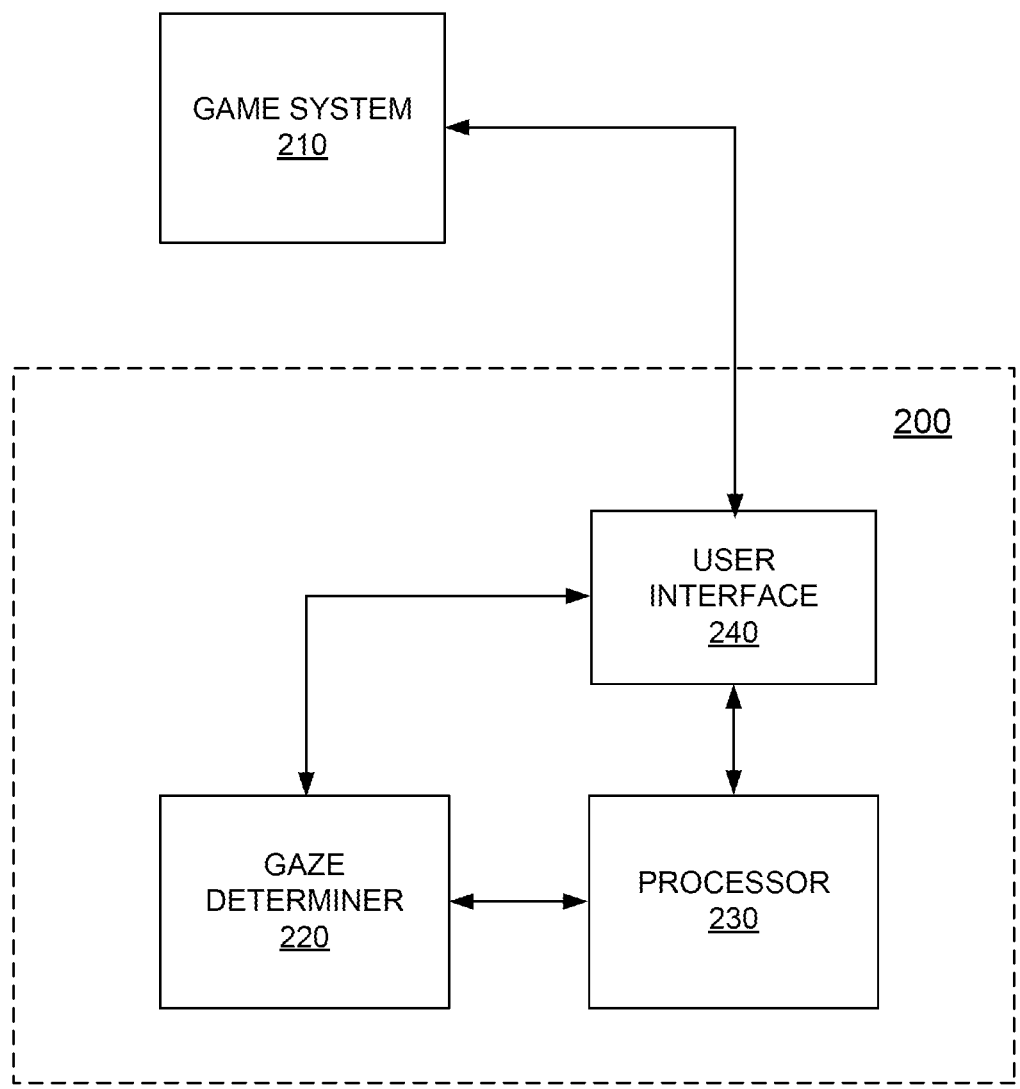
FIG. 2 is a block diagram of a gaze tracking system for gaze tracking for user interface in accordance with one implementation of the present disclosure.

FIG. 2 is a block diagram of a gaze tracking system 200 for gaze tracking for user interface in accordance with one implementation of the present disclosure. In the illustrated implementation of FIG. 3, the system 200 includes a gaze determiner 220, a processor 230, and a user interface 240 coupled to the processor 230 and a game system 210. In one implementation, the blocks 220, 230, 240 of the system 200 are configured entirely with hardware including one or more digital signal processors (DSPs), general purpose microprocessors, application specific integrated circuits (ASICs), field programmable logic arrays (FPGAs), or other equivalent integrated or discrete logic circuitry. In one implementation, the system 200 combines gaze tracking with other methods including at least one of: head movement tracking, gaze zone estimation, and message notification.

In the illustrated implementation of FIG. 2, the gaze determiner 220 determines whether head movement tracking is turned on. If it is determined that the head movement tracking is turned on, the gaze determiner 220 directs the processor 230 to combine the gaze tracking with the head movement tracking to provide fine tuning. For example, the head movement tracking provides a rough estimate of the direction in which the user's head is facing, while the gaze tracking provides more detailed estimation of the direction of the user's head. In one implementation, the head movement tracking is performed by accelerometer(s) and/or gyroscope(s) disposed within the headset. In another implementation, the gaze tracking is performed by camera(s) disposed within the headset.

The gaze determiner 220 then determines whether gaze zone estimation is on. In one implementation, the gaze zone estimation divides the user view screen into zones (e.g., a preset size of a rectangular box) and uses the gaze tracking to estimate the direction of the user's gaze to be within a selected zone. If it determined that the gaze zone estimation is on, the gaze determiner 220 directs the processor 230 to combine the gaze tracking with the gaze zone estimation to select a gaze zone. In one implementation, one or more gaze zones (including the selected zone) may be expanded or highlighted in overlay picture(s) or picture-in-picture (PIP) mode to show the detail view of the objects or persons within the user's gaze.

The gaze determiner 220 also determines whether a notification is received. In one implementation, the notification includes communication to the user while the user is playing or experiencing a game or interactive application program. If it determined that the notification is received, the gaze determiner 220 directs the processor 230 to display a notice on the user view screen indicating that the communication is received. In one implementation, the communication includes message(s) from other users playing or experiencing the same game or interactive application program with the user. In another implementation, the communication includes message(s) from the game system. In a further implementation, the notice is provided on the user view screen as a bubble icon. In one implementation, when the user gazes in the direction of the icon, the details of the message are displayed on the user view screen. Thus, the gaze determiner 220 and the processor 230 provide gaze tracking for the user interface 240. The above-described notification method provides notification to the user playing, for example, an interactive game, with minimal disruption.

In one implementation, the game system 210 includes a gaming console providing interactive games or other application programs. In another implementation, the game system 210 includes an online interactive game or other application program. In yet another implementation, the game system 210 includes a virtual reality and/or augmented reality interactive game or application program.

In one implementation, the gaze tracking features are used by game developer(s)/central commander(s) to customize the game or experience. For example, in shooting games, the user's gaze may be used to switch weapons or functions of the weapons in real-time.

Figure 3A:
FIG. 3A is one example of the user view screen in accordance with one implementation of the present disclosure.

FIG. 3A is one example of the user view screen 300 mentioned above in accordance with one implementation of the present disclosure. The user view screen 300 of FIG. 3A includes two icons 310, 320. Icon 310 may appear at the beginning of an interactive game, for example, to indicate to the user that the gaze tracking mode is turned on. Icon 320 appears on the screen 300 when a notification message is received.

As shown in the example of FIG. 3A, the gaze icon 310 is displayed on the view screen 300 to indicate to the user that the gaze tracking mode is turned on. In one implementation, the gaze icon 310 is an eye-shaped icon. In another implementation, the gaze icon 310 is a cursor.

In one implementation, a message may be received while the user is playing a game. Thus, when the message is received, a notification icon 320 may be displayed in a predetermined area of the view screen 300. The message which triggers the notification icon 320 may be related to the game currently being played (e.g., a notice from a game provider), or it may be unrelated to the game (e.g., a text from a friend). When the message is received and the notification icon 320 is displayed, the gaze icon 310 may be moved by the user directing the gaze toward the notification icon 320.

Figure 3B:
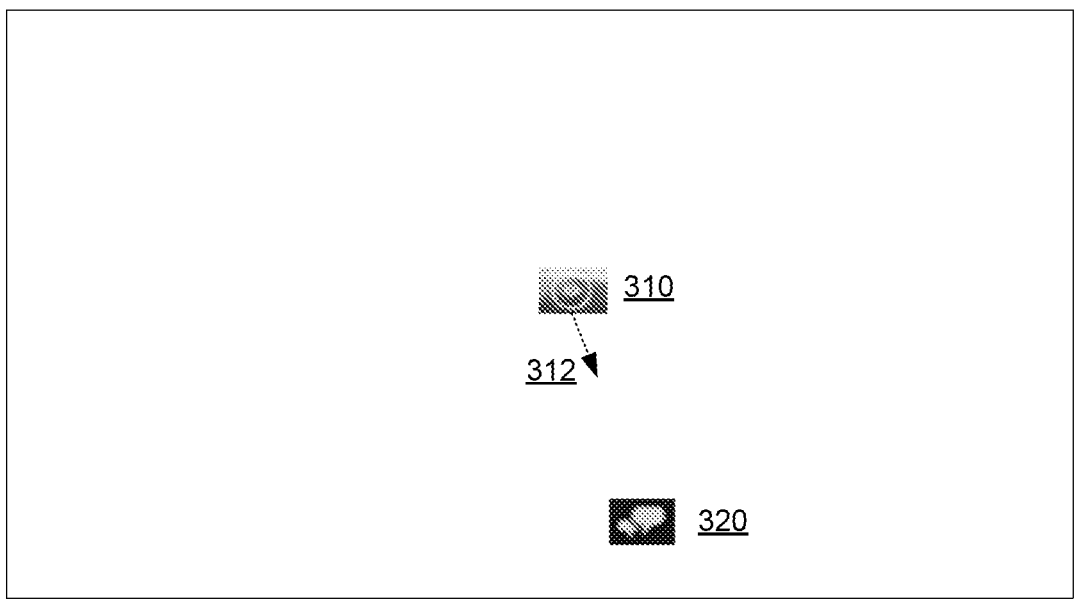
FIG. 3B shows the user moving the gaze icon toward the notification icon by moving the gaze toward the notification icon.

FIG. 3B shows the user moving the gaze icon 310 toward the notification icon 320 by moving the gaze 312 toward the notification icon 320.

Figure 3C:
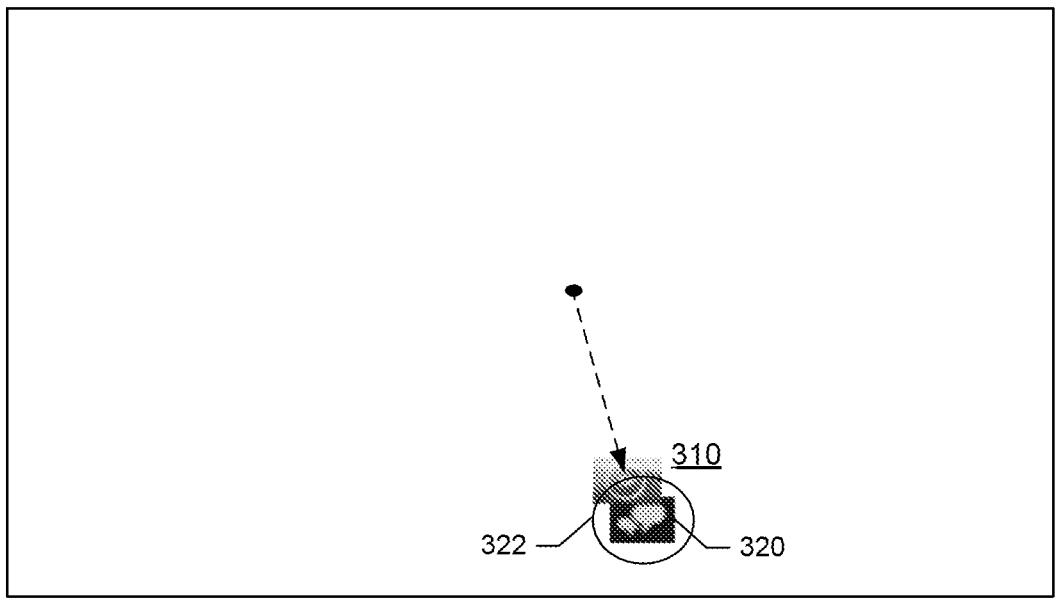
FIG. 3C shows the gaze icon being moved into a decision area around the notification icon.

FIG. 3C shows the gaze icon 310 being moved into a decision area 322 around the notification icon 320. Thus, when the gaze icon 310 is moved into the decision area 322, additional information about the message may be displayed.

Figure 3D:
FIG. 3D shows a view screen including a message panel which replaces the notification icon with details of a received message, when the gaze icon is moved into the decision area.

FIG. 3D shows a view screen 350 including a message panel 330 which replaces the notification icon 320 with details of a received message 332, when the gaze icon 310 is moved into the decision area 322 as illustrated in FIG. 3C. Thus, the implementations of FIGS. 3A through 3D enable the user to briefly check the contents of the message 332 corresponding to the notification icon 320, for example, without interrupting the game and without operating a gaming controller used by the user for the game. When the user wishes to perform any additional actions related to the message 332, the user can perform the actions using the gaming controller. For example, the user can check the full text of the message 332 by launching a message application or by replying to the message 332. In this example, the game application may then be suspended to perform the additional actions.

In one implementation, when the gaze icon 310 stays within the decision area 322 for a predetermined period of time, additional actions related to the message 332 may be performed. In another implementation, after the gaze icon 310 moves into the decision area 322, the additional actions may be performed by a user's input such as gaming controller or voice command. In one implementation, the decision area 322 is same or different size as the gaze icon 310. In another implementation, the notification icon 320 changes in size when the gaze icon 310 moves into the decision area 322. In a further implementation, the notification icon 320 is highlighted to help the user easily understand the status of the message 332.

In one implementation, once the notification icon 320 is selected (e.g., by moving the gaze icon 310 into the decision area 322), a message 332 is displayed within the message panel 330 so that the user can check the message. The size of the message panel 330 may be larger than the notification icon 320 to accommodate the large size of the message 332. In one implementation, the notification icon 320 and the additional information (e.g., the message panel 330 and the message 332) disappears from the view screen 300 after a predetermined period of time (after it appears on the screen). Accordingly, the above-described implementations enable gaze operation for the user to check messages without disturbing the game screen or gaming control operations currently being played.

In a particular implementation, a game device is disclosed. The game device includes: a sensor to track gaze movements of a user; a processor operable to: obtain information about the gaze movements from the sensor; execute an application program to display a gaze icon based on the gaze information and a notification icon within a screen image of the application program on a display, wherein the notification icon is displayed at a predetermined position of the screen image.

In one implementation, the application program is a game application. In one implementation, the notification icon receives notification to display from application programs different from the game application. In one implementation, the game device is a head-mounted display (HMD).

In another particular implementation, a system for gaze tracking to track gaze of a user within a user view screen is disclosed. The system includes: a processor to combine the gaze tracking with head movement tracking, wherein head movements of the head movement tracking provide rough estimate of a direction of the gaze of the user, while eye movements of the gaze tracking provide fine tuning of the direction of the gaze of the user within the user view screen; a gaze determiner to direct the processor to divide the user view screen into a plurality of gaze zones, and to combine the gaze tracking with the gaze zone estimation to select a gaze zone from the plurality of gaze zones as the direction of the gaze of the user, when the gaze determiner determines that gaze zone estimation is turned on.

In one implementation, the head movement tracking is performed by at least one accelerometer and at least one gyroscope disposed within a headset communicating with a game system. In one implementation, the gaze tracking is performed by at least one camera disposed within the headset. In one implementation, the system further includes a user interface coupled to the processor, the user interface to display an icon on the user view screen when the gaze tracking is turned on. In one implementation, the user interface also displays a notification icon on the user view screen when a notification is received. In one implementation, the notification includes a message from a game system. In one implementation, the notification includes a message from another user in a game system. In one implementation, the game system comprises a gaming console providing interactive games.

Figure 4A:
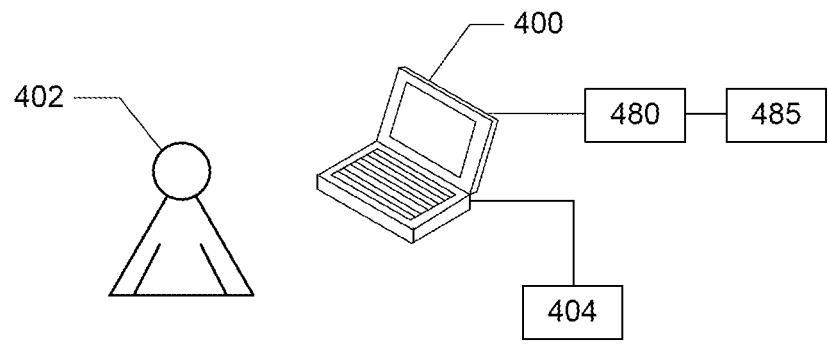
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a gaze tracking application 490 for gaze tracking for user interface with respect to the process 100 of FIG. 1 and the system 200 of FIG. 2.

Figure 4B:
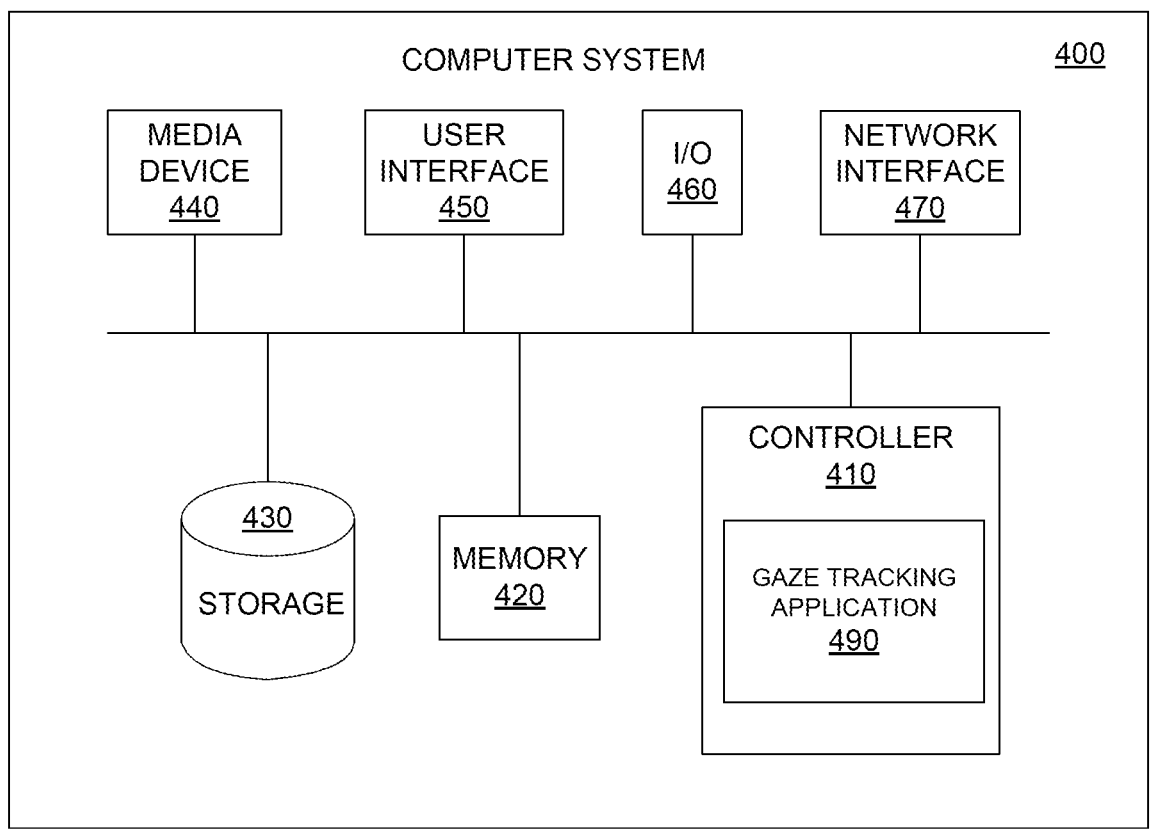
FIG. 4B is a functional block diagram illustrating the computer system hosting the gaze tracking application in accordance with an implementation of the present disclosure.

The computer system 400 stores and executes the gaze tracking application 490 of FIG. 4B. In addition, the computer system 400 may be in communication with a software program 404. Software program 404 may include the software code for the gaze tracking application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the gaze tracking application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the gaze tracking application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the gaze tracking application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the gaze tracking application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In a particular implementation, a non-transitory computer-readable storage medium storing a computer program to track gaze of a user within a user view screen is disclosed. The computer program includes executable instructions that cause a computer to: combine the gaze tracking with head movement tracking, wherein head movements of the head movement tracking provide rough estimate of a direction of the gaze of the user, while eye movements of the gaze tracking provide fine tuning of the direction of the gaze of the user within the user view screen; divide the user view screen into a plurality of gaze zones when gaze zone estimation is turned on; and combine the gaze tracking with the gaze zone estimation to select a gaze zone from the plurality of gaze zones as the direction of the gaze of the user.

In one implementation, the computer program further includes executable instructions that cause a computer to: display a notification icon on the user view screen when a notification is received; and display a message of the notification on the user view screen when it is determined that the gaze of the user has moved to the notification icon.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method to track gaze of a user within a user view screen, the method comprising:
    combining gaze tracking with head movement tracking,
        wherein head movements of the head movement tracking provide a rough estimate of a direction of the gaze of the user, while eye movements of the gaze tracking provide fine tuning of the direction of the gaze of the user within the user view screen, and
        wherein the head movement tracking provides rough estimate of a direction in which a user's head is facing;
    dividing the user view screen into a plurality of gaze zones when gaze zone estimation is turned on; and
    combining the gaze tracking with the gaze zone estimation to select a gaze zone from the plurality of gaze zones as the direction of the gaze of the user,
    wherein the selected gaze zone provides the fine tuning of the direction of the gaze of the user within the user view screen and provides a more detailed estimation of the direction in which the user's head is facing.

2. The method of claim 1, further comprising
    displaying an icon on the user view screen when the gaze tracking is turned on.

3. The method of claim 1, wherein each gaze zone of the plurality of gaze zones is a preset size of a rectangular box.

4. The method of claim 1, wherein one or more gaze zones around the selected zone is expanded or highlighted in an overlay picture or picture-in-picture mode to show a detail view of objects or persons within the gaze of the user.

5. The method of claim 1, further comprising
    displaying a notification icon on the user view screen when a notification is received.

6. The method of claim 5, wherein the notification includes a message from a game system.

7. The method of claim 6, wherein the notification includes a message from another user in the game system.

8. The method of claim 7, further comprising
    displaying the message on the user view screen when it is determined that the gaze of the user has moved to the notification icon.

9. A game device comprising:
    a sensor to track gaze movements of a user;
    a processor operable to:
    obtain gaze information about the gaze movements from the sensor,
        wherein the gaze information is obtained by tracking eye movements of the user including selecting a gaze zone from a plurality of gaze zones to provide a fine-tuned direction of a gaze of the user within a view screen of the user; and
    execute an application program to display a gaze icon based on the gaze information and a notification icon within a screen image of the application program on a display,
        wherein the notification icon is displayed at a predetermined position of the screen image.

10. The game device of claim 9, wherein the application program is a game application.

11. The game device of claim 10, wherein the notification icon receives notification to display from application programs different from the game application.

12. The game device of claim 9, wherein the game device is a head-mounted display (HMD).

13. A system to track gaze of a user within a user view screen, the system comprising:
    a processor to combine gaze tracking with head movement tracking, wherein head movements of the head movement tracking provide a rough estimate of a direction of the gaze of the user, while eye movements of the gaze tracking provide fine tuning of the direction of the gaze of the user within the user view screen, and wherein the head movement tracking provides rough estimate of a direction in which a user's head is facing; and
    a gaze determining mechanism to direct the processor to divide the user view screen into a plurality of gaze zones, and to combine the gaze tracking with the gaze zone estimation to select a gaze zone from the plurality of gaze zones as the direction of the gaze of the user, when the gaze determining mechanism determines that gaze zone estimation is turned on,
    wherein the selected gaze zone provides the fine tuning of the direction of the gaze of the user within the user view screen and provides a more detailed estimation of the direction in which the user's head is facing.

14. The system of claim 13, wherein the head movement tracking is performed by at least one accelerometer and at least one gyroscope disposed within a headset communicating with a game system.

15. The system of claim 14, wherein the gaze tracking is performed by at least one camera disposed within the headset.

16. The system of claim 13, further comprising
    a user interface coupled to the processor, the user interface to display an icon on the user view screen when the gaze tracking is turned on.

17. The system of claim 16, wherein the user interface also displays a notification icon on the user view screen when a notification is received.

18. The system of claim 17, wherein the notification includes a message from a game system.

19. The system of claim 17, wherein the notification includes a message from another user in a game system.

20. The system of claim 19, wherein the game system comprises a gaming console providing interactive games.

* * * * *